United States Patent [19]

Eckel et al.

[11] Patent Number: 5,300,550
[45] Date of Patent: Apr. 5, 1994

[54] THERMOPLASTIC MOLDING COMPOSITIONS

[75] Inventors: Thomas Eckel, Dormagen; Dieter Wittmann, Köln; Karl-Heinz Ott, Leverkusen; Claus H. Wulff; Dieter Freitag, both of Krefeld, all of Fed. Rep. of Germany

[73] Assignee: Bayer Aktiengesellschaft, Leverkusen, Fed. Rep. of Germany

[21] Appl. No.: 21,379

[22] Filed: Feb. 23, 1993

[30] Foreign Application Priority Data

Mar. 13, 1992 [DE] Fed. Rep. of Germany ....... 4208108

[51] Int. Cl.$^5$ .................................. C08K 3/34
[52] U.S. Cl. ................................ 524/444; 524/456
[58] Field of Search ............... 524/444, 445, 446, 447, 524/448, 449, 450, 497, 493, 847, 451, 456

[56] References Cited

U.S. PATENT DOCUMENTS 3,945,965  3/1976  Ramig, Jr. et al. ................ 524/456
4,355,127  10/1982  Isley ................................ 524/444

FOREIGN PATENT DOCUMENTS 0398551  11/1990  European Pat. Off. ............ 524/445
0024155  2/1991  Japan .................................. 524/445
575480  2/1946  United Kingdom .

OTHER PUBLICATIONS

Patent Abstracts of Japan, vol. 8, No. 172 (C-237) (1609) & JP-A-59 071 340 (Toyoda Chuo Kenkyusho).
Dev. Sedimentology 3B (Int Clay Conf 1981) 1981, pp. 763–769 Squza Santos, Riego 'Effect of lithium treatment on the bulk densities of exfoliated vermiculites'.

Primary Examiner—Paul R. Michl
Assistant Examiner—Peter Szekely
Attorney, Agent, or Firm—Joseph C. Gil; Aron Preis

[57] ABSTRACT

A thermoplastic molding composition is disclosed comprising
 (i) a thermoplastic resin
 (ii) a low molecular weight additive, and
 (iii) a specially prepared carrier material magnesium-aluminum-silicate.

The carrier material which is characterized by its particle size and low bulk density was found to be effective in minimizing the thermal processing-related evaporation of the low molecular additive.

11 Claims, No Drawings

THERMOPLASTIC MOLDING COMPOSITIONS

FIELD OF THE INVENTION

The invention relates to thermoplastic molding compositions and more particularly to compositions containing additives of low molecular weight.

SUMMARY OF THE INVENTION

A thermoplastic molding composition is disclosed comprising
(i) a thermoplastic resin
(ii) a low molecular weight additive, and
(iii) a specially prepared carried material magnesium-aluminum-silicate.

The carrier material which is characterized by its particle size and low bulk density was found to be effective in minimizing the thermal processing-related segregation and decomposition of the low molecular additive.

BACKGROUND OF THE INVENTION

Thermoplastic polymers and mixtures of different thermoplastic polymers play an important part as engineering plastics. Most of these polymers and compositions contain, in addition to residual monomers, residual solvents and oligomeric additives of low molecular weight imparting to them certain properties, e.g. stabilizers, pigments, mold release agents, flame-proofing agents and antistatic agents.

Owing to their volatility at the conventional processing temperatures (generally 200° to 350° C.) such additives of low molecular weight partly segregate from the thermoplastic compositions loss their effectiveness and impair quality, i.e. cause surface faults on the shaped articles, deposits on injection molding tools and unpleasant odors.

It has now been discovered that specially prepared magnesium aluminum silicates are capable of binding additives of low molecular weight in polymers to such an extent as to ensure that the latter do not evaporate during processing. These carrier materials do not impair the characteristics of thermoplastic polymers so that e.g. their toughness decreases slightly, the surface is preserved, resistance to chemicals and heat distortion temperature are improved. Also flame-proofing agents, of which in general major quantities are required, remain at processing temperatures in the polymer and can be fully effective in case of fire.

DETAILED DESCRIPTION OF THE INVENTION

The object of the invention are thermoplastic molding compositions comprising
A. 100 parts by weight of a thermoplastic homopolymer or copolymer of ethylenically unsaturated monomers or of a polymer of bifunctional reactive compounds
B. 0.1 to 40 preferably 0.5 to 20 parts by weight of an additive with a molecular weight of less than 2000 g/mol, preferably less than 1000 g/mol, and
C. 0.1 to 50 preferably 0.5 to 15 parts by weight of a magnesium aluminum silicate with a bulk density lower than 1 g/cm$^3$ preferably lower than 0.5 g/cm$^3$ and in particular lower than 0.2 g/cm$^3$; a particle diameter of 1 to 5000 μm preferably 3 to 500 and in particular 5 to 100 μm, and a content of transition metal compounds of 0 to 5% by weight preferably 0 to 1% by weight, and in particular of 0 to 0.5% by weight.

Group A Thermoplastic Polymers

Group A thermoplastic polymers can be homopolymers or copolymers of ethylenically unsaturated monomers or polymers of bifunctional reactive compounds. Group A thermoplastic polymers according to the invention can also be mixtures of different polymers.

Group A thermoplastic polymers comprise homopolymers or copolymers of one or several ethylenically unsaturated monomers (vinyl monomers) such as e.g. ethylene, propylene, vinyl acetate, styrene, α-methyl styrene, styrenes substituted in the nucleus, acrylonitrile, methacrylonitrile, methyl methacrylate, maleic anhydride, N-substituted maleimides, chloroprene, butadiene-1,3, isopropene as well as $C_1$–$C_{18}$ alkyl acrylates and -methacrylates.

The following vinyl polymers can particularly be used:
vinyl polymers (A.1) free from rubber,
rubber-containing vinyl polymers such as graft polymers of vinyl monomers on a rubber (A.2),
mixtures of A.1 and A.2 polymers.

The A.1 (co)polymers are resinous, thermoplastic and free from rubber.

Preferred A.1 vinyl copolymers are prepared from styrene, α-methyl styrene, styrene substituted in the nucleus or mixtures thereof (A.1.1) on the one hand and on the other hand acrylonitrile, methacrylonitrile, methyl methacrylate, maleic anhydride, N-substituted maleimide or mixtures thereof (A.1.2).

Particularly preferred are A.1 copolymers of 50 to 98 percent by weight of A.1.1 and 50 to 2 percent by weight of A.1.2. monomers.

Particularly preferred A.1 copolymers are those of styrene, acrylonitrile and optionally methyl methacrylate, α-methyl styrene, acrylonitrile and optionally methyl methacrylate as well as styrene, α-methyl styrene, acrylonitrile and optionally methyl methacrylate.

The A.1 styrene-acrylonitrile copolymers are known and can be produced by radical polymerization, in particular emulsion, suspension, solvent or bulk polymerization. The molecular weights $\overline{M}w$ (weight average determined by light scattering or sedimentation) of the A.1 copolymers are preferably from 15,000 to 200,000.

Other specially preferred A.1 copolymers are random copolymers of styrene and maleic anhydride preferably produced by continuous bulk or solvent polymerization, with incomplete monomer conversion. Their composition may be varied within wide limits. They preferably contain 5 to 25 percent by weight of maleic anhydride units.

The term styrene polymers includes styrenes substituted in the nucleus such a p-methyl styrene, vinyl toluene, 2,4-dimethyl styrene and other substituted styrenes such as α-methyl styrene.

The molecular weights $\overline{M}n$ (number average) of the styrene/maleic acid anhydride copolymers preferably are from 60,000 to 200,000. Their limiting viscosity number preferably is 0.3 to 0.9 (measured in dimethyl formamide at 25° C.; cf. Hoffman, Kromer, Kuhn, Polymeranalytik I, Stuttgart, 1977, pp 316 ff).

The A.2 vinyl polymers are thermoplastic and contain rubber. Preferred A.2 vinyl polymers are graft polymers, which include graft polymers with rubber elastic properties made from at least two of the following monomers: chloroprene, butadiene-1,3, isopropene, styrene, acrylonitrile, ethylene, propylene, vinyl acetate, $C_1$–$C_{18}$ alkyl acrylates and -methacrylates. Such polymers are described e.g. in "Methoden der Organischen Chemie" (Houben-Weyl), Vol. 14/1, Georg Thieme-Verlag Stuttgart, 1961, pp 393–406 and in C. B. Bucknall, "Toughened Plastics", Appl. Science Publishers, London 1977. Preferred A.2 polymers are partly cross-linked and have gel contents of more than 20 percent by weight preferably more than 40 percent by weight and in particular more than 60 percent by weight.

Preferred A.2 vinyl polymers are graft polymers of:

A.2.1. 5 to 95 preferably 30 to 80 parts by weight of a mixture consisting of

A.2.1.1 50 to 95 parts by weight of styrene, a-methyl styrene, styrenes halogen- or methyl-substituted in the nucleus, methyl methacrylate or mixtures thereof and A.2.1.2 5 to 50 parts by weight of acrylonitrile, methacrylonitrile, methyl methacrylate, maleic anhydride, $C_1$–$C_4$-alkyl- or phenyl-N-substituted maleimides or mixtures thereof on A.2.2 5 to 95 preferably 20 to 70 parts by weight of a rubber with a second order transition temperature of lower than $-10°$ C.

Preferred A.2 graft polymers are e.g. polybutadienes, butadiene/styrene copolymers and acrylate rubbers grafted with styrene and/or acrylonitrile and/or alkyl acrylates or methacrylates, e.g. copolymers of the type described in U.S. Pat. No. 3,564,077 which is incorporated herein by reference; and polybutadienes, butadiene/acrylonitrile copolymers, polyisobutenes or polyisoprenes grafted with alkyl acrylates or alkyl methacrylates, vinyl acetate, acrylonitrile, styrene and-/or alkyl styrenes such as described e.g. in U.S. Pat. No. 3,919,353 which is incorporated herein by reference.

Specially preferred A.2 polymers are ABS polymers such as described e.g. in U.S. Pat. No. 3,644,574 and GB Patent 1,409,275 both of which are incorporated herein by reference.

Specially preferred A.2 graft polymers can be produced by graft polymerization of a. 10 to 70 preferably 15 to 50 and particular 20 to 40 percent by weight (based on A.2 graft polymer) of acrylates or methacrylates, or of 10 to 70 preferably 15 to 50 and particular 20 to 40 percent by weight of a mixture of 10 to 50 preferably 20 to 35 percent by weight, (based on the mixture) of acrylonitrile, acrylate or methacrylate, and 50 to 90 preferably 65 to 80 percent by weight, (based on the mixture) of styrene (the total as constituting graft monomers A.2.1 of a graft polymer) onto b. 30 to 90 preferably 50 to 85 and in particular 60 to 80 percent by weight, (based on A.2 graft polymer) of a butadiene polymer containing at least 50 percent by weight, (based on b.) of butadiene units (b. constituting the graft base A.2.2 of a A.2 graft polymer)

to form a graft copolymer wherein the gel content in the graft base b. is preferably not less than 70 percent by weight (measured in toluene), the grafting degree G is 0.15 to 0.55 and the weight average particle diameter $d_{50}$ of the A.2 graft polymer is 0.05 to 2 μm preferably 0.1 to 0.6 μm.

Acrylates and methacrylates used are esters of acrylic acid or of methacrylic acid and alkanols with 1 to 18 C-atoms. Particularly preferred are methyl methacrylate, ethyl methacrylate, propyl methacrylate, n-butyl acrylate, t-butyl acrylate and t-butyl methacrylate.

The graft-base b. may contain in addition to butadiene units up to 50 percent by weight, (based on b.) of units of other ethylenically unsaturated monomers such as styrene, acrylonitrile, $C_1$–$C_4$-alkyl ester or acrylic or methacrylic acid (such as methyl acrylate, ethyl acrylate, methyl methacrylate, ethyl methacrylate, vinyl ester and/or vinyl ether). The preferred graft base is polybutadiene.

It is known that in the course of graft polymerization the graft monomers are not polymerized completely onto the graft base: therefore, according to the invention the term A.2 graft polymers include products produced by polymerization of the graft monomers in the presence of the graft base, even if grafting is incomplete.

Grafting degree G is the weight ratio of the grafted-on graft monomers and the graft base (dimensionless number).

The average particle diameter $d_{50}$ is the diameter above and below which there are 50 percent by weight of the particles. It can be determined by means of the ultracentrifuge (W. Scholtan, H. Lange, Kolloid, Z. and Z. Polymere 250 (1972), pp 782–796).

Other specially preferred A.2 polymers are graft polymers consisting of

τ. 20 to 90 percent by weight, (based on graft polymer A.2) of acrylate rubber with a second order transition temperature of lower than $-20°$ C. (as graft base A.2.2) and δ. 10 to 80 percent by weight, (based on graft polymers A.2,) of at least one ethylenically-unsaturated polymerisable monomer, the homo- or copolymers of which when produced in the absence of τ, have a second order transition temperature above 25° C., (as graft monomers A.2.1), The acrylate rubbers τ, are preferably polymers of alkyl acrylates, optionally with up to 40 percent by weight (based on τ,) of other ethylenically unsaturated polymerizable monomers. The preferred acrylates include $C_1$–$C_8$-alkyl esters, e.g. methyl-, ethyl-, butyl-, n-octyl- and 2-ethyl-hexylester preferably halogenated $C_1$–$C_8$-alkyl esters such as chloroethyl acrylate, and mixtures thereof.

Monomers with more than one polymerizable bond can be copolymerized in order to crosslink the polymer. Preferred examples of crosslinking monomers are esters of unsaturated monocarboxylic acids with 3 to 8 C-atoms and unsaturated monovalent alcohols with 3 to 12 C-atoms or saturated polyols with 2 to 4 OH-groups and 2 to 20 C-atoms such as ethylene glycol dimethacrylate, allyl methacrylate; polyfunctional unsaturated heterocyclic compounds such as trivinyl and triallyl cyanurate; polyfunctional vinyl compounds such as di- and tri-vinyl benzenes, triallyl phosphate and diallyl phthalate.

Preferred crosslinking monomers are allyl methacrylate, ethylene glycol dimethacrylate, diallyl phthalate and heterocyclic compounds with not fewer than 3 ethylenically unsaturated groups.

Specially preferred crosslinking monomers are the cyclic monomers triallyl cyanurate, triallyl isocyanurate, trivinyl cyanurate, triacrylol hexahydro-s-triazine, and triallyl benzenes.

The quantity of crosslinking monomers preferably amounts to from 0.02 to 5, in particular 0.05 to 2 percent by weight, (based on the graft base τ).

With cyclic crosslinking monomers having at least 3 ethylenically unsaturated groups it is advantageous to limit their quantity to less than 1 percent by weight of τ (graft-base).

"Other" preferred ethylenically unsaturated polymerizable monomers which can be used in addition to the acrylates, to produce τ (graft-base) are e.g. acrylonitrile, styrene, α-methyl styrene, acryl amides, vinyl $C_1$-$C_6$-alkyl ether, methyl methacrylate and butadiene. Preferred acrylate rubbers for use as τ (graft-base) are emulsion polymers with a gel content of not less than 60 percent by weight.

Other suitable graft bases A.2.2 are silicone rubbers with graft-active sites as described in DE-OS 3,704,657, DE-OS 3,704,655, DE-OS 3,631,540 and DE-OS 3,631,539.

The gel content of A.2.2 graft base is determined at 25° C. in dimethyl formamide (M. Hoffman, H. Kramer, R. Kuhn, Polymeranalytik I and II, Georg-Thieme-Verlag, Stuttgart, 1977).

The A.2 graft polymers may be produced by known methods such as bulk, suspension, emulsion or bulk-suspension polymerization.

The group A thermoplastic polymers may also be polymers produced by polycondensation from at least one reactive compound such as polycarbonates, polyesters, polysulfones, polyether sulfones, polyimides, polyether imides, polyether ketones, polyarylene sulfides, polyamides and polyurethanes.

Preferred polycarbonates are based on diphenols according to formula (I)

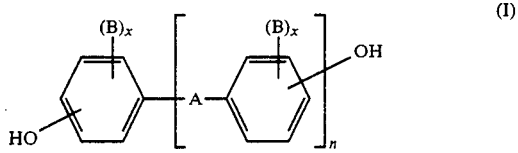

(I)

where
A is a single bond, $C_1$-$C_5$-alkylene, $C_2$-$C_5$-alkylidene, $C_5$-$C_6$ cycloalkylidene, —S— or $SO_2$,
B is chlorine, bromine
x is 0, 1 or 2 and
n is 1 or 0.

Suitable polycarbonates according to the invention are both homopolycarbonates and copolycarbonates.

A may also be a mixture of the thermoplastic polycarbonates defined above.

Polycarbonates may be produced in known manner from diphenols with phosgene according to the phase interface method or with phosgene according to the homogeneous phase method, the so-called pyridine process, whereby the molecular weight can be adjusted in known manner by an appropriate quantity of known chain terminators.

Suitable chain terminators are e.g. phenol, p-chlorophenol, p-tert. butyl phenol or 2,4,6-tribromophenol, but also long chain alkyl phenols such as 4-(1,3-tetramethylbutyl) phenol according to DE-OS 2,842,005 (Le A 19 006) or monoalkyl phenol or dialkyl phenol with altogether 8-20 C-atoms in the alkyl substituents according to German Patent Application P 3,506,472.2 (Le A 23 654), such as 3,5-di-tert. butyl phenol, p-iso-octyl phenol, p-tert. octyl phenol, p-dodecyl phenol and 2-(3,5-dimethyl-heptyl) phenol and 4-(3,5-dimethyl-heptyl) phenol.

The quantity of chain terminators generally amounts to between 0.5 and 10 mol-%, in relation to the sum of the diphenols (I) applied in each case.

The A polycarbonates suitable according to the invention have average molecular weights $\overline{M}w$ (weight average determined e.g. by ultracentrifugation or light scattering measurement) from 10,000 to 200,000 preferably from 20,000 to 80,000.

Suitable diphenols according to formula (I) are e.g. hydroquinone, resorcinol, 4,4'-dihydroxy diphenyl, 2,2-bis-(4-hydroxyphenyl) propane, 2,4-bis-(4-hydroxyphenyl)-2-methyl butane, 1,1-bis-(4-hydroxyphenyl) cyclohexane, 2,2-bis-(3-chloro-4-hydroxyphenyl) propane, 2,2-bis-(3,5-di-bromo-4-hydroxyphenyl) propane.

Preferred diphenols according to formula (I) are 2,2-bis-(4-hydroxyphenyl) propane, 2,2-bis-(3,5-dichloro-4-hydroxyphenyl) propane and 1,1-bis-(4-hydroxyphenyl) cyclohexane.

Preferred diphenols are also alkyl-substituted dihydroxy diphenyl-cycloalkanes according to formula (II),

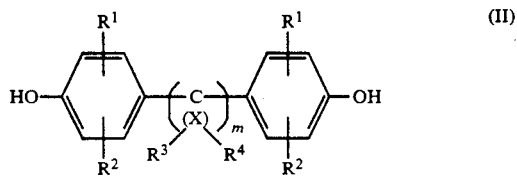

(II)

wherein
$R^1$ and $R^2$ are independently of one another hydrogen, halogen, preferably chlorine or bromine, $C_1$-$C_8$-alkyl, $C_5$-$C_6$-cycloalkyl, $C_6$-$C_{10}$-aryl, preferably phenyl, and $C_7$-$C_{12}$-aralkyl, preferably phenyl $C_1$-$C_4$-alkyl, in particular benzyl,
m is an integer between 4 and 7 preferably 4 or 5,
$R^3$ and $R^4$ are irrespective of one another hydrogen or $C_1$-$C_6$ alkyl and can be selected individually for every x, and
x is carbon, subject to the condition that on at least one atom X $R^3$ and $R^4$ simultaneously signify alkyl.

The A polycarbonates suitable according to the invention may be branched in known manner, i.e. preferably by attachment of 0.05 to 2.0 mol-%, in relation to the sum of diphenols applied, on tri- or polyfunctional compounds, e.g. such with three or more than three phenolic groups.

Preferred polycarbonates are in addition to bisphenol A homopolycarbonate the copolycarbonates of bisphenol A with up to 15 mol-%, in relation to the mol totals of diphenols, on 2,2-bis-(3,5-dibromo-4-hydroxyphenyl) propane.

The A polycarbonates may be partly or entirely substituted by aromatic polyester carbonates.

Preferred A polyesters are polyalkylene terephthalates. These are reaction products of aromatic dicarboxylic acids (or their derivatives capable of reaction such as dimethyl esters or anhydrides) and aliphatic, cycloaliphatic or arylaliphatic diols and mixtures of such reaction products.

Preferred polyalkylene terephthalates can be produced from terephthalic acids (or their derivatives capable of reaction) and aliphatic and cycloaliphatic diols with 2 to 10 C-atoms according to known methods (Kunststoff-Handbuch), Vol. VIII, pp 695 ff, Carl Hanser Verlag, Munich 1973).

Preferred polyalkylene terephthalates contain 80 to 100 preferably 90 to 100 mol-%, in relation to the dicarboxylic acid component, of terephthalic acid residues and 80 to 100 preferably 90 to 100 mol-%, in relation to the diol component, of ethylene glycol and/or butane diol-1,4-residues. In addition to terephthalic acid residues 0 to 20 mol-% residues of other aromatic dicarboxylic acids with 8 to 14 C-atoms or aliphatic dicarboxylic acids with 4 to 12 C-atoms may be present, such as residues of phthalic acid, isophthalic acid, naphthalene-2,6-dicarboxylic acid, 4,4'-diphenyldicarboxylic acid, succinic, adipic, sebacic, azelaic or cyclohexane diacetic acid. In addition to ethylene glycol and/or butane diol-1,4-residues 0 to 20 mol-% of other aliphatic diols with 3 to 12 C-atoms or cycloaliphatic diols with 6 to 12 C-atoms may be present, e.g. residues of pentane diol-1,5, hexane diol-1,6, cyclohexane dimethanol-1,4, 3-methyl pentane diol-1,3 and 1,6, 2-ethyl hexane diol-1,3, 2,2-dimethyl propane diol-1,3, hexane diol-2,5, 1,4-di($\beta$-hydroxy ethoxy phenyl) propane, 2,4-dihydroxy-1,1,3,3-tetramethyl cyclobutane, 2,2-bis-(3-$\beta$-hydroxy ethoxy phenyl) propane and 2,2-bis-(4-hydroxy propoxy phenyl) propane (DE-OS 2,407,647, 2,407,776, 2,715,932).

The polyalkylene terephthalates may be branched by incorporating relatively small quantities of tri- or quadribasic alcohols or tri- or quadribasic carboxylic acids such as described in DE-OS 1,900,270 and U.S. Pat. No. 3,692,744. Examples of preferred branching agents are trimesic acid, trimellitic acid, trimethylolethane and -propane and pentaerythritol. It is advisable not to use more than 1 mol-% of the branching agent, in relation to the acid component.

Particularly preferred are polyalkylene terephthalates manufactured only from terephthalic acid (or its derivatives capable of reaction such as its dialkyl esters) and ethane diol and/or butane diol-1,4 as well as their mixtures.

Preferred polyalkylene terephthalates are also copolyesters, produced from at least two of the above diols; specially preferred copolyesters are poly(ethylene glycol/butane diol-1,4)-terephthalates. The copolyesters may contain the various diol residues in the form of blocks or in statistically distributed manner.

The polyalkylene terephthalates generally have an intrinsic viscosity between 0.4 and 1.4 dl/g preferably 0.5 to 1.3 dl/g and in particular 0.6 to 1.2 dl/g, determined in each case in phenol/o-dichlorobenzene (1:1 parts by weight) at 25° C.

Suitable aromatic polysulfones and polyether sulfones are preferably linear thermoplastic polyarylene polyether sulfones, in which the arylene units are linked via ether and sulfone groups. They are obtained by reacting an alkaline metal double salt of a bivalent phenol (bisphenol) with a benzoid compound containing two halogen atoms, whereby at least one of the two reactants must contain a sulfone group (—SO$_2$—). Polyether sulfones are known as is their method of production (cf. U.S. Pat. No. 3,264,536, GB Patent 1,264,900, EPA 0,038,028).

The A polyether sulfones according to the invention contain recurrent units according to formula (III)

—O—Z—O—W           (III)

in which

Z is the residue of a bivalent phenol and

W is the residue of the benzoid compound with an inert electrophilic group whereby Z and W are linked by aromatic carbon atoms via valency bonds with the oxygen atoms and at least one of the residues Z and W has a sulfone group between aromatic carbon atoms.

Preferred diphenols for the production of the aromatic A polyether sulfones are compounds according to formula (IV)

HO—Z—OH           (IV)

wherein Z signifies a bivalent uni- or polynuclear aromatic residue with 6-30 C-atoms and the two OH-groups are linked directly with C-atoms.

Specially preferred diphenols correspond to formula (V)

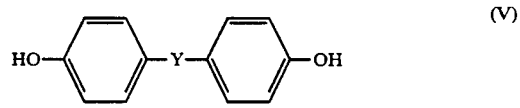

in which

Y signifies a single linkage, an alkylene or alkylidene residue with 1-7 C-atoms, a cycloalkylene or cycloalkylidene residue with 5-12 C-atoms, —O—, —S—,

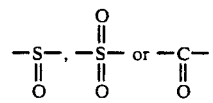

as well as their derivatives alkylated in the nucleus and halogenated in the nucleus.

Examples of diphenols are: hydroquinone, resorcinol, dihydroxydiphenyls, bis-(hydroxyphenyl)-alkanes, bis-(hydroxyphenyl)-cycloalkanes, bis-(hydroxyphenylethers, bis-(hydroxyphenyl)-sulfoxides, bis-(hydroxyphenyl)-sulfones and α,α'bis(hydroxyphenyl)-diisopropyl benzenes and corresponding derivatives alkylated in he nucleus and halogenated in the nucleus.

The most important diphenols are: bisphenol A, tetramethyl bisphenol A, 1,1-bis-(4-hydroxyphenyl)-isobutane, 1,1-bis-(4-hydroxy-phenyl)cyclohexane, 4,4'-dihydroxy-biphenyl, 4,4'-dihydroxydiphenyl-sulfide, 4,4'-dihydroxy-diphenylsulfone and their di- and tetrahalogenated and alkylated derivatives. Specially preferred is bisphenol A. Use may also be made of any mixtures of the above diphenols.

Preferred aromatic dihalogen compounds are binuclear compounds according to formula (VI)

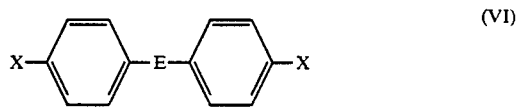

In this

X is a halogen (F, Cl, Br, I) and

E are bivalent electrophilic groups such as sulfone, carbonyl, vinyl, sulfoxide or azo-groups.

Each of the two benzene rings may be substituted with one or several saturated hydrocarbon residues or electrophilic groups.

Preferred aromatic dihalogen compounds (VI) are 4,4'-dichloro-diphenyl sulfone and 4,4'-dichlorobenzophenone).

The aromatic polyether sulfones may also be branched. Suitable branching agents are those used in known manner for the production of aromatic polyesters (DE-OS 2,940,024) and for the production of aromatic polyether carbonates (DE-OS 3 007 934).

By way of chain terminators when producing aromatic group A polyether sulfones, use is preferably made of phenol, alkyl phenols with $C_1$-$C_{12}$ alkyl groups and halogenated phenols such as bromides and chlorides of $C_1$-$C_{10}$ alkanes in quantities between 0.1 and 10 mol-% (in the case of phenols in relation to diphenols, and in the case of chlorides in relation to the aromatic dihalogen compounds).

The reduced viscoties ($\eta_{rel}$) of the group A aromatic polyether sulfones range between 0.15 and 1.5 dl/g and preferably between 0.35 and 0.65 dl/g (determined using solutions of 20 mg group A polyether sulfone in 10 ml $CHCl_3$ at 25° C.).

Preferred polyarylene sulfides consist substantially of phenylene units linked with one another via sulfide groups, in accordance with formula (VII), $$(-Ar-S-)_n \quad \text{(VII)}$$

where Ar is a substituted or unsubstituted phenyl residue and n at least 50. Suitable starting compounds and production methods are e.g. those described in the U.S. Pat. Nos. 3,354,129 and 3,919,177.

The polyphenylene sulfides may be present in linear, branched or cross-linked form.

For their production normally, polyhalogenated aromatic compounds are reacted with sulphur-containing compounds in polar organic solvents, optionally in the presence of catalysts.

Suitable polyhalogenated aromatic compounds for producing polyarylene sulfides are e.g. 1,2-dichlorobenzene, 1,3-dichlorobenzene, 1,4-dichlorobenzene, 2,5-dichlorotoluene, 1,4-dibromobenzene, 2,5-dibromo-aniline and other substances as well as mixtures thereof. If branched polyarylene sulfides are to be produced, at least 0.05 mol-% of the polyhalogenated aromatic compounds must be tri- or tetrahalogen aromatics such as e.g. 1,2,4-trichlorobenzene, 1,3,5-trichlorobenzene or 1,2,4,5-tetrachlorobenzene.

Suitable sulphur-containing compounds for producing polyarylene sulfides are e.g. alkali sulfides such as sodium or potassium sulfide. Preferably use is also made of the hydrates of these alkali sulfides. The alkali sulfides may also be produced from hydrogen sulfides with the aid of alkali hydroxides such as lithium hydroxide, sodium hydroxide or potassium hydroxide.

Suitable polar solvents for manufacturing polyarylene sulfide are e.g. N-methyl-pyrrolidone, N-ethyl-pyrrolidone, N-methyl-caprolactam, N-ethylcaprolactam or 1,3-dimethylimide-azolidinone. Suitable catalysts are inter alia alkali fluorides, alkali phosphates and alkali carboxylates in quantities of 0.02 to 1.0 mol per mol alkali sulfide.

Group B Additives

Suitable additives of low molecular weight are preferably stabilizers, pigments, mold release agents, antistatic agents and flame-proofing agents. These are added to the thermoplastic polymers in the usual quantities.

The additives according to the invention are of low molecular weight, i.e. their molecular weights are smaller than 2000 g/mol, and preferably smaller than 1000 g/mol.

Preferred group B additives according to the invention are flame-proofing agents: both halogen-containing and halogen-free flame-proofing compounds are suitable.

Suitable halogen compounds are preferably organic chloro and/or bromo compounds which are stable during the production and processing of the molding compositions of the invention so that no corrosive gases are released and effectiveness is not impaired.

Preferred group B additives are, e.g.

1. Chlorinated and brominated diphenyls such as octachlorodiphenyl, decachlorodiphenyl, octabromodiphenyl, decabromodiphenyl.

2. Chlorinated and brominated diphenyl ethers such as octa- and deca-diphenyl ether and octa- and deca-bromodiphenyl ether.

3. Chlorinated and brominated phthalic anhydride and its derivatives such as phthalimides and bisphthalimides, e.g. tetrachloro- and tetrabromophthalic anhydride, tetrachloro- and tetrabromophthalimide, N,N'-ethylene-bis-tetrachloro- and N,M'-ethylene-bis-tetrabromophthalimide, N-methyltetrachloro-and N-methyltetrabromo-phthalimide.

4. Chlorinated and brominated bisphenols such as 2,2-bis-(3,5-dichloro-4-hydroxyphenyl) propane and 2,2-bis-(3, 5-dibromo-4-hydroxyphenyl)-propane.

5. 2,2-bis-(3,5-dichloro-4-hydroxyphenyl)-propaneoligocarbonate and 2,2-bis-(3,5-dibromo-4-hydroxyphenyl)-propane-oligo-carbonate with a mean polycondensation degree of 2-20.

Bromine compounds are preferred to chlorine compounds.

Halogen-free compounds are particularly preferred by way of flame-proofing compounds.

All phosphorous compounds normally usable as flame-proofing agents are suitable as group B additives, in particular phosphine oxides and derivatives of acids of phosphorus and salts of acids and acid derivatives of phosphorus.

Preference is given to derivatives of acids of phosphorus and their salts, whereby these are, according to the present invention, derivatives (e.g. esters) of phosphoric acid, phosphonic acid, phosphinic acid, phosphorous acid, also in each case in dehydrated form, as well as alkali, alkaline earth and ammonium salts of these acids or their derivatives (e.g. partly esterified acids).

Specially preferred phosphorus compounds are such according to formula (VIII

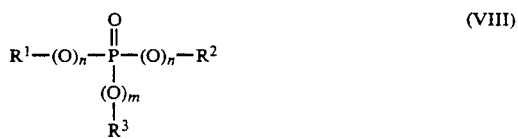

where $R^1$, $R^2$ and $R^3$ are independently of one another an optionally halogenated $C_1$-$C_8$-alkyl or an optionally halogenated and/or alkylated $C_5$ or $C_6$-cycloalkyl or an optionally halogenated and/or alkylated and/or aralkylated $C_6$-$C_{30}$-aryl and "n" and "m" are independently of one another 0 or 1.

Such phosphorus compounds are generally known (cf. e.g. Ullmann, Enzyklopädie der Technischen Chemie, Vol. 18, pp 301 ff, 1979). The aralkylated phosphorus compounds are described e.g. in DE-OS 3,824,356.

Such $C_1$-$C_8$-alkyl residues in accordance with (VIII) as are halogenated may be singly or multiply halogenated, linear or branched. Examples of alkyl residues are chloroethyl, 2-chloropropyl, 2,3-dibromopropyl, butyl, methyl or octyl.

Such $C_5$- or $C_6$-cycloalkyls according to (VIII) as are halogenated and/or alkylated may be singly or multiply halogenated and/or alkylated $C_5$- or $C_6$-cycloalkyls, i.e., for example, cyclopentyl, cyclohexyl, 3,3,5-trimethyl-cyclohexyl and fully chlorinated cyclohexyl.

Such $C_6$-$C_{30}$-aryl residues according to (VIII) as are halogenated and/or alkylated and/or aralkylated may be mono or polynuclear, singly or multiply halogenated and/or alkylated and/or aralkylated, e.g. chlorophenyl, bromophenyl, pentachlorophenyl, pentabromophenyl, phenyl, cresyl, isopropylphenyl, benzyl-substituted phenyl and naphthyl.

Phosphorus compounds according to formula (VIII) of which use may be made according to the invention are e.g. tributyl phosphate, tris-(2-chloroethyl) phosphate, tris-(2,3-dibromopropyl) phosphate, triphenylphosphate, tricresyl phosphate, diphenylcresyl phosphate, diphenyloctyl phosphate, diphenyl-2-ethylcresyl phosphate, tri(isopropylphenyl) phosphate, tris-(p-benzylphenyl) phosphate, triphenyl phosphinoxide, methane dimethyl phosphonate, methane dipenthyl phosphonate and phenyl diethyl phosphonate.

Also dimeric and oligomeric phosphates with molecular weights of less than 2000 g/mol and preferably less than 1000 g/mol are suitable flame-proofing agents. These are described e.g. in European Application EPA 0,363,608.

Group C Magnesium-Aluminum-Silicates

C silicates according to the invention are magnesium aluminum-silicates. Pertaining to the group of micaceous minerals these silicates consist of thin, flat platelets and are characterized by crystal water contents higher than 5 percent.

For these silicates to be effective in this invention, i.e. serving as inorganic carrier materials for additives in thermoplastic polymers, they have to undergo several special preparative treatment steps.

A) At high temperatures, preferably from 700° to 1100° C., the aluminum silicate is expanded by evaporating the water of crystallization. Thus its volume increases by a factor of 10 to 30 and internal cavities are formed. The bulk density of the aluminum silicate is reduced from the initial about 2 to 3 g/cm³ to less than 0.5 g/cm³, and in particular less than 0.2 g/cm³.

B) The expanded silicate is treated with acids, preferably hydrochloric acid or sulfuric acid, in order to remove unwanted transition metal compounds such as oxides or hydroxides of iron, manganese, chromium or other metals. Depending on the polymer, e.g. basicity or Lewis acidity may be detrimental, and with virtually all polymers it is undesirable for the carrier material to have a color of its own.

To avoid impairment of the thermoplastic polymers it is necessary to reduce the quantity of transition metal compounds to less than 5 percent preferably to less than 1 percent and in particular to less than 0.5 percent.

The particles of the specially pretreated silicates preferably have diameters from 3 to 500 μm and in particular from 5 to 100 μm. If the particles are smaller than 1 μm the material loses its capacity to absorb compounds of low molecular weight and if they are larger than 5000 μm this will cause the mechanical properties of the molding compositions to be impaired.

The molding compositions according to the invention may in addition contain the usual quantities of additives of higher molecular weight, glass fibers or other polymers which are not thermoplastically processable such as polytetrafluoroethylene.

The molding compositions according to the invention can be produced by mixing the constituents in known manner and subjecting them at elevated temperatures, preferably at 200° to 350° C., to melt compounding or melt extrusion in conventional apparatuses such as internal kneaders, extruders and twin screws. The constituents may be mixed in sequence or simultaneously. In special cases it may be advantageous to prepare premixed master batches of the additives of low molecular weight and the magnesium-aluminum-silicates.

Hence, another object of the invention is a process for producing the molding compositions described by mixing the constituents at elevated temperature.

The molding compositions according to the invention may be used for producing shaped articles of any type, e.g. by injection molding. The following are examples of shaped articles:

Casing parts (e.g. for household appliances such as juice extractors, coffee machines, mixers), cladding plates for the construction industry or parts for motor cars. Shaped articles are also used in electrical appliances, e.g. multipoint connectors, since their electrical properties are very good.

Shaped articles can also be produced by deepdrawing from previously prepared plates or foils.

Hence, another object of the invention consists in the use of the molding compositions described for producing shaped articles.

The invention is further illustrated but is not intended to be limited by the following examples in which all parts and percentages are by weight unless otherwise specified.

EXAMPLES

Group A Thermoplastic Polymers

A1 Linear bisphenol A-polycarbonate with a relative solution viscosity of 1.26 to 1.28 (determined in $CH_2Cl_2$ at 25° C. and at a concentration of 0.5 g/100 ml).

A2 Styrene/acrylonitrile-copolymer (styrene/acrylonitrile with a weight ratio of 72:28) with a limiting viscosity number of 0.55 dl/g (determined in dimethyl formamide at 20° C.).

A3 Graft polymer of 45 parts by weight of a mixture of styrene and acrylonitrile in a weight ratio of 72:28 on 55 parts by weight of particulate crosslinked polybutadiene rubber (average particle diameter $d_{50}=0.4$ μm) produced by emulsion polymerization.

A4 A3 graft polymer+polytetrafluoroethylene.

The tetrafluoroethylene polymer is applied as a coagulated mixture of a graft polymer emulsion according to A3 in water and a tetrafluoro-ethylene polymer emulsion in water. The weight ratio of the A3 graft polymer and the tetrafluoroethylene polymer in the mixture is 90:10. The tetrafluoroethylene polymer emulsion prior to coagulation has a solids content of 60 percent by weight, and contains particles of a diameter from 0.05 to 0.5 μm. The graft polymer emulsion has a solids content of 34 percent by weight and an average latex particle diameter ($d_{50}$) of 0.4 μm.

Group B Additives
Triphenyl phosphate (molecular weight 326.3 g/mol)
Group C Silicate An expanded (i.e. already treated according to step A above) magnesium-aluminum-silicate (commercial designation 'Vermiculit') with a bulk density of 0.11 g/cm³ was treated with water, separating off both the relatively light constituents (organic residues) and the heavy, non-expanded mineral residues. Then the material was stirred for about 30 minutes in 50% by weight sulfuric acid in order to dissolve the transition metal compounds which exert an undesirable effect on the thermoplastic polymers during processing. The white powder remaining behind (bulk density: 0.15 g/cm³) was washed, dried and intensively mixed in the melt with the fourfold quantity of triphenyl phosphate. After cooling, the comminuted material (premix of magnesium aluminum-silicate and triphenyl phosphate at a weight ratio of 1:4) was ready for introduction into the polymer mixtures.

Production and testing of molding compositions according to the invention

The constituents A, B and C were molten at temperatures of 210° to 250° C. and homogenized, in an internal kneader with a capacity of 3 liters.

On an injection molding machine, bars measuring 80 × 10 × 4 mm were made from the molding compositions (processing temperature 260° C.), which were used to measure the notched impact strength (according to ISO 180) at room temperature.

The heat distortion temperature Vicat B, was determined according to DIN 53 460.

The flame retardation of the test specimens was measured according to UL-Subj. 94 V on bars produced at 280° C. in an injection molding machine and measuring 127 × 12.7 × 1.6 mm.

The UL 94 V-test is carried out as follows:

Specimens of the material are molded to bars measuring 127 × 12.7 × 1.6 mm. The bars are mounted vertically in such a way that the underside of the test specimen is 305 mm above a strip of cotton bandaging material. Every test bar is ignited individually in two consecutive igniting operations of 10 sec. duration: the combustion properties after each igniting operation are observed and the specimen is then assessed. To ignite the specimen use is made of a Bunsen burner giving a 10 mm (3.8 inch) blue flame generated with natural gas with a calorific value of 3.73 × 10⁴ kJ/m³ (1000 BUT per cubit foot).

The classification UL 94 V-O is awarded to those products tested according to the standard UL 94 V which have the following properties. There are no specimens burning longer than 10 sec. after each removal of the test flame: with two flame applications to every set of specimens they do not exhibit a total flame-emitting time of more than 50 sec: they do not contain any specimens burning down completely as far as the clip at the upper end of the specimen: they do not include any specimens igniting cotton wool directly below the specimen by burning drops or particles: nor do they include any specimens which continue to glow longer than 30 sec. after removal of the test flame.

Other UL 94 classifications relate to specimens which are less flame-resistant and self-extinguishing and which give off flame-emitting drops or particles. These classifications are designated UL 94 V-1 and V-2. N. P. means "not passed" and is the classification of specimens, the after-burning time of which is longer than or equal to 30 sec.

The properties of the molding compositions acording to the invention are compiled in the following table.

TABLE 1

| | Composition and characteristics of molding compositions | | | | | | | | |
|---|---|---|---|---|---|---|---|---|---|
| | Constituents | | | | | | | $a_k$ | Vicat |
| Example | A1 | A2 | A3 | A4 | B | C | UL 94 Y 1.6 mm[1] | [kJ/ m²] | VST/B120 [°C.] |
| | [parts by weight] | | | | | | | | |
| 1[+)] | 65 | 15 | 5 | 3 | 12 | — | V 0 | 21 | 90 |
| 2 | 65 | 15 | 5 | 3 | — | 10[2)] | V 0 | 21 | 102 |
| 3[+)] | 65 | 15 | 5 | 3 | 10 | — | V 1 | 22 | 96 |
| 4[+)] | 65 | 15 | 5 | 3 | 8 | — | N.P. | 33 | 102 |

[1)]Conditioning of test pieces for 7 days at 23° C. and 50%
[2)]Effective content of triphenyl phosphate 8 parts by weight
[+)]Comparison Table 1 shows that only Example 2 (according to the invention) offers an optimum of properties as regards flame retardation, heat distortion and notched impact strength. It also shows that the effect of the additive is improved by the presence of the magnesium-aluminum-silicate. The advantageous flame retardation is achieved with as low an effective triphenyl phosphate content as 8 parts by weight whereas the result in the corresponding comparative Examples 3 and 4 with respectively 10 and 8 parts by weight of triphenyl phosphate is definitely poorer.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising
   (i) a thermoplastic resin selected from the group consisting of homopolymers of ethylenically unsaturated monomers, copolymers of ethylenically unsaturated monomers, and polycondensation polymers of bifunctional reactive compounds
   (ii) a functional additive having a molecular weight of less than 2000 g/mol selected from the group consisting of a stabilizer, pigment, mold release agent, antistatic agent and flame retarding agent, and
   (iii) a carrier material which includes a magnesium-aluminum silicate having a bulk density of less than 1 g/cm³, a particle diameter of 1 to 5000 μm and a content of transition metal compounds of less than 5 percent relative to the weight of said magnesium-aluminum silicate, said (ii) being present in an amount of 0.1 to 40 percent and said (iii) being present in an amount of about 0.1 to 50 percent relative to the weight of said (i).

2. The composition of claim 1 wherein said polycondensation polymer is selected from the group consisting of polyester, polyamide, polyarylene sulfide and polycarbonate.

3. The composition of claim 1 wherein said thermoplastic resin is a vinyl copolymer consisting of 50 to 98 percent by weight of at least one member selected from the group consisting of styrene and methyl methacrylate and 50 to 2 percent by weight of at least one member selected from the group consisting of acrylonitrile, methacrylonitrile, methyl methacrylate, maleic anhydride and N-substituted maleimide.

4. The composition of claim 1, wherein said (i) is a graft polymer of resin-forming vinyl monomer on rubber.

5. The molding composition of claim 4, wherein graft polymer is produced by graft polymerization of 5 to 95 parts by weight of a mixture of 50 to 95 parts by weight of at least one member selected from the group consisting of styrene, $C_1$-$C_8$-alkyl methacrylates and $C_1$-$C_8$-alkyl acrylates and 5 to 50 parts by weight of at least one member selected from the group consisting of acrylonitrile, methacrylonitrile, $C_1$-$C_8$-alkyl methacrylate, $C_1$-$C_8$-alkyl acrylates, maleic anhydride, $C_1$-$C_4$-alkyl-N-substituted maleimide and phenyl-N-substituted maleimide, on 5 to 95 parts by weight of rubber having a second order transition temperature of less than $-10°$ C.

6. The composition of claim 4 in which the rubber is at least one member selected from the group consisting of diene rubber, acrylate rubber, silicone rubber and ethylene-propylene-diene-rubber.

7. The composition of claim 1 wherein said (ii) is a flame retarding agent.

8. The molding composition of claim 7 wherein said agent is triphenyl phosphate.

9. The composition of claim 1 wherein said bulk density is less than about 0.5 $g/cm^3$.

10. The composition of claim 1 wherein said particle diameter is about 5 to 100 micrometers.

11. A process for making a thermoplastic molding composition comprising melt blending (i) a thermoplastic resin selected from the group consisting of homopolymer of ethylenically unsaturated monomers, copolymers of ethylenically unsaturated monomers, and polymers of bifunctional reactive compounds with a mixture, said mixture comprising (ii) a functional additive having a molecular weight of less than 2000 g/mol selected from the group consisting of a stabilizer, pigment, mold release agent, antistatic agent and flame retarding agent and (iii) a carrier material which includes a magnesium-aluminum silicate having a bulk density of less than 1 $g/cm^3$, a particle diameter of 1 to 5000 μm and a content of transition metal compounds of less than 5 percent relative to the weight of said magnesium-aluminum silicate, said functional additive being present in an amount of 0.1 to 40 percent and said carrier material being present in an amount of about 0.1 to 50 percent relative to the weight of said resin.

* * * * *